United States Patent
Taylor et al.

(10) Patent No.: US 9,582,806 B2
(45) Date of Patent: Feb. 28, 2017

(54) CUSTOMER RELATIONSHIP MANAGEMENT SYSTEM WITH HIERARCHICAL TAGGING

(75) Inventors: Jacob Taylor, Santa Clara, CA (US); Ajay Gupta, Cupertino, CA (US); Vineet Dhyani, Cupertino, CA (US)

(73) Assignee: SugarCRM Inc., Cupertino, CA (US)

( * ) Notice: Subject to any disclaimer, the term of this patent is extended or adjusted under 35 U.S.C. 154(b) by 572 days.

(21) Appl. No.: 12/062,509

(22) Filed: Apr. 3, 2008

(65) Prior Publication Data

US 2008/0275851 A1 Nov. 6, 2008

Related U.S. Application Data

(60) Provisional application No. 60/921,766, filed on Apr. 3, 2007.

(51) Int. Cl.
*G06F 17/30* (2006.01)
*G06Q 30/02* (2012.01)

(52) U.S. Cl.
CPC .................... *G06Q 30/02* (2013.01)

(58) Field of Classification Search
CPC .................................................. G06Q 30/02
USPC ....................................................... 707/736
See application file for complete search history.

(56) References Cited

U.S. PATENT DOCUMENTS

| | | | |
|---|---|---|---|
| 6,587,847 B1 * | 7/2003 | Stier et al. | 706/50 |
| 7,693,906 B1 * | 4/2010 | Amidon et al. | 707/749 |
| 2002/0091510 A1 * | 7/2002 | Forrest et al. | 704/8 |
| 2004/0024739 A1 * | 2/2004 | Copperman et al. | 707/1 |
| 2005/0108041 A1 * | 5/2005 | White | 705/1 |
| 2008/0052203 A1 * | 2/2008 | Beyer et al. | 705/28 |
| 2008/0239413 A1 * | 10/2008 | Vuong et al. | 358/496 |

OTHER PUBLICATIONS

Ho, Ask Readers: Tips on Organizing Bookmarks?, Nov. 2006, pp. 1-13.*
Aibek, Del.iciou.us-Save/Share/Seach/Discover Favorite Links, Sep. 2006, pp. 1-5.*
Ogbuji Real Web 2.0: Bookmarks? Tagging? Delicious, Oct. 26, 2006, pp. 1-10.*
FreeCRM Tags Web 2.0; FreeCRM.com is the First CRM to Implement Web "Tagging", Apr. 26, 2006, pp. 1-2.*
Mathes, Folksonomies—Cooperative Classification and Communication Through Shared Metadata, Dec. 2004, pp. 1-13.*
Simple Hierarchical Tagging, Feb. 1, 2006, pp. 1-5.*
Murphy, The Design and Implementation of the Database File System, Jan. 11, 2002 pp. 1-12.*

* cited by examiner

*Primary Examiner* — Albert Phillips, III
(74) *Attorney, Agent, or Firm* — Steven M. Greenberg, Esq.; CRGO Law

(57) ABSTRACT

A hierarchical tagging system and method are provided. In one embodiment, a software-based customer relationship management system and method may include the hierarchical tagging system.

17 Claims, 7 Drawing Sheets

FIGURE 4

CUSTOMER RELATIONSHIP MANAGEMENT SYSTEM WITH HIERARCHICAL TAGGING

PRIORITY CLAIM/RELATED APPLICATIONS

This application claims priority under 35 USC 119(e) to U.S. Provisional Patent Application Ser. No. 60/921,766, filed on Apr. 3, 2007 and entitled "Customer Relationship Management System with Hierarchical Tagging" which is incorporated herein by reference.

FIELD

The system and method relate generally to a business software system and method and in particular to a software-based system and method for providing customer relationship management.

BACKGROUND

Customer relationship management (CRM) systems and solutions are well known. For example, typical known CRM systems include Microsoft® CRM, SalesForce, a CRM product provided by SalesForce.com, Netsuite CRM, and SAP Business One CRM. However, conventional CRM systems have significant limitations that include a lack of flexibility, high costs, and a closed-source structure which is embedded into the traditional product offerings. These limitations have led to a failure rate of over 70% with traditional CRM implementations. Thus, it is desirable to provide a customer relationship management system and method that overcomes these limitations of typical CRM systems and it is to this end that the system and method are directed.

SUMMARY

A novel business application that includes hierarchical tagging is provided. In one embodiment, the business application may be software based customer relationship management system.

BRIEF DESCRIPTION OF THE DRAWINGS

FIG. 4 illustrates an example of a user interface for creating a new tag of the hierarchical tagging system;

DETAILED DESCRIPTION OF ONE OR MORE EMBODIMENTS

The system and method are particularly applicable to an open source customer relationship management software system and it is in this context that the system and method will be described. It will be appreciated, however, that the algorithms, data structures, processes and modules of the system and method have greater utility since these modules, algorithms, data structures and processes disclosed herein can be equally applied to other non-open source CRM systems, as well as other business software application systems as well as other database software systems. For purposes of illustration, the described system is an implementation in a customer relationship management (CRM) and groupware system. In the example below, the CRM and groupware system is the Sugar Enterprise version 4.5 commercially available from SugarCRM Inc.

The system may be implemented using a base class known as SugarBean, and a data retrieval API. A few of the methods provided in the base class include methods for building list queries, saving, and retrieving individual items. Each specific type of data creates a subclass of this base class. The base class is called SugarBean in the illustrative example that is described below. There is at least one subclass of SugarBean for each module. SugarBeans also are used for creating database tables, cleaning out database tables, loading records, loading lists, saving records, and maintaining relationships. One example of a SugarBean subclass is a Contact subclass. The Contact subclass is a simple object that fills in some member variables on the SugarBean and leverages SugarBean for much of its logic and functionality. For example, the security associated with the Contact subclass is automatically created for Contact by SugarBean that contains, among other things, the functions and processes that are shared by the other modules. Another example of a SugarBean subclass is Users which is a module that is security related and contains the list of users as well as users who should not have row level security (described below in more detail) applied to them. For this reason these modules have the bypass flag set to skip adding the right join for verifying security. The SugarCRM Sugar Professional system is a web based system with many concurrent users. Since this program contains critical data to the users, it is imperative that they have quick access to the system and their data. The most frequent activity in the program is to look at existing data.

Figure 1A:
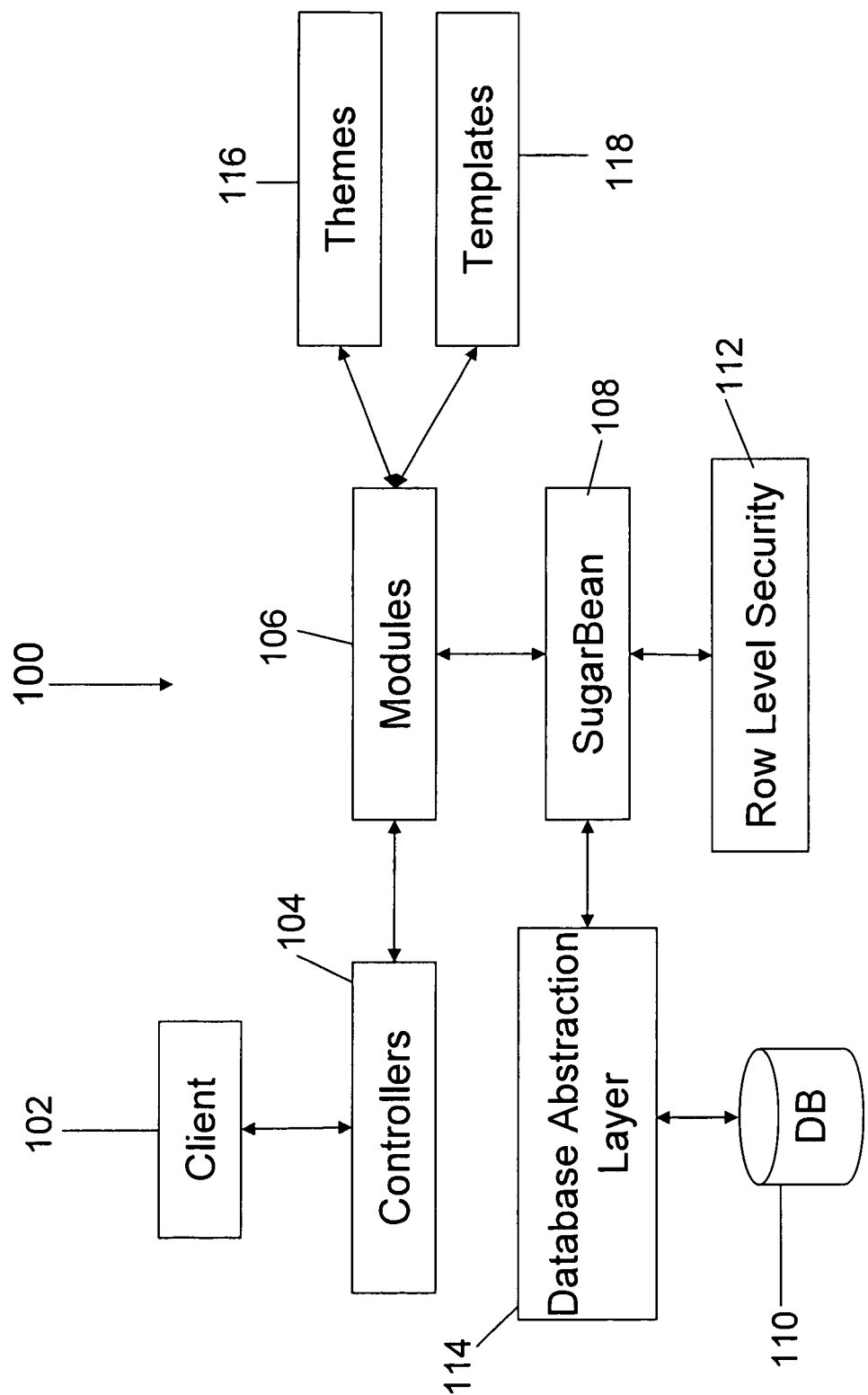
FIG. 1A is a diagram illustrating a customer relationship management system that incorporates the various features of the invention.
Figure 1B:
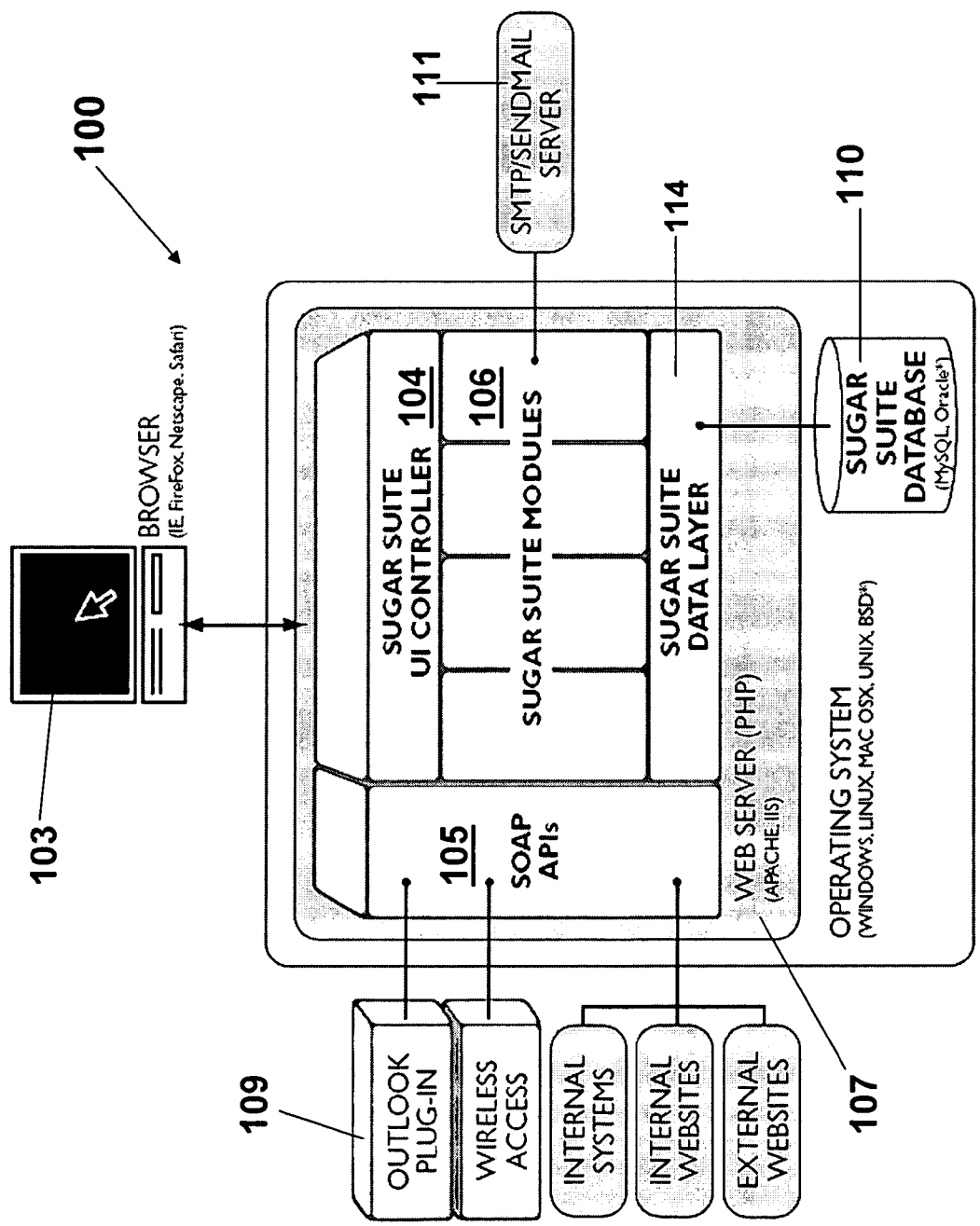
FIG. 1B illustrates more details of the customer relationship management system that incorporates the various features of the invention.

FIG. 1A is a diagram illustrating a customer relationship management (CRM) system 100 that is an example of a software-based business software application. In one embodiment, the system 100 may be implemented as a software system and the elements shown in FIGS. 1A and 1B are thus implemented as a plurality of lines of computer code that may be executed by a processor of a computer system, such as a server computer wherein the various lines of computer code are stored in a memory associated with the computer system and the system interfaces with a database 110 that stores the data associated with the system 100. The system may have one or more clients 102, such as a browser application executed on a typical computing device (a browser client session), that accesses the system over a communications network 103 such as the Internet, a cellular network, a wireless network and the like. The computing devices may include a laptop, table or desktop computer system, a PDA, a mobile phone, a portable wireless email device and the like. The client's 102 interactions with the system are managed and go through a set of one or more controllers 104. The controllers 104 are the entry-point into the system for an entity that is using the system wherein the entity may be a person who accesses the system, such as by using a browser application, a computing device or a software program that uses this entry point. The controllers 104 take care of functions and operations including, for example, session tracking, session security and user authentication. The controllers also, for each user, prepare the screen/user interface or the wrapper for the content and determine which module of the application the user is trying to access and get the requested module to process the request.

The system has one or more modules 106 that are components of application functionality and provide certain functionality to the entity accessing the system. The modules 106 of the exemplary CRM system shown in FIG. 1A may include, by way of example, a portal module, a calendar module, an activities module, a contacts module, an accounts module, a leads module, an opportunities module, a quotes module, a products module, a cases module, a bug tracker module, a documents module, an emails module, a campaigns module, a project module, an RSS module, a forecasts module, a reports module and a dashboard module. The system may include different, more or fewer modules and the systems with those other combination of modules are within the scope of the system and method. Each of these modules provides a different functionality to the users of the system so that, for example, the calendar module provides a calendaring functionality to the CRM system that is instantiated with the system. The system may also include an administration module that handles the typical administrative functions of the system. In the exemplary system shown in FIG. 1A, each module contains a subclass of a SugarBean base object 108 and each module references the SugarBean to retrieve the data from the database 110 required for display and uses certain functions and operations instantiated in the SugarBean base object.

Figure 2:
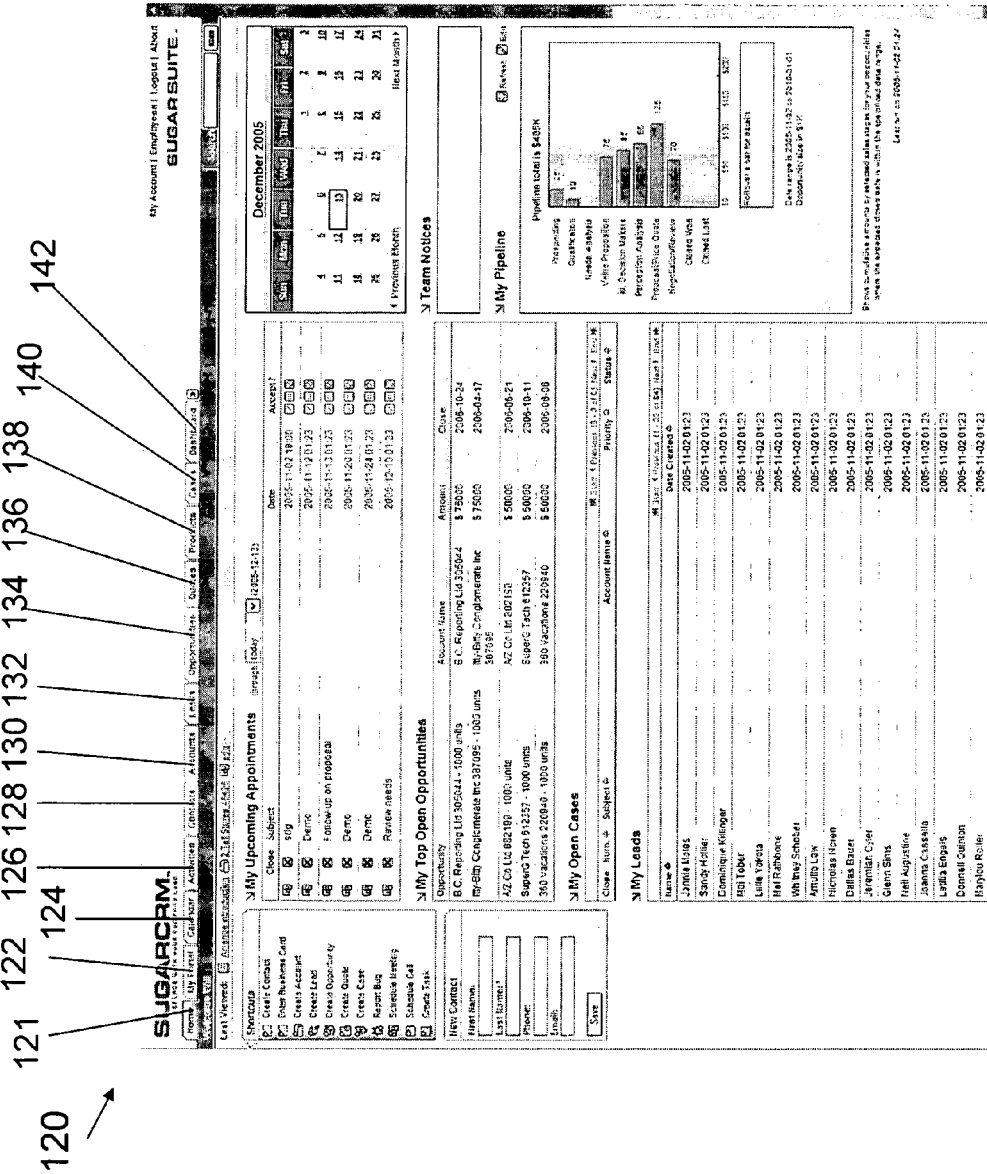
FIG. 2 is a diagram illustrating an example of the user interface of the system in FIGS. 1A and 1B.

FIG. 2 is a diagram illustrating an example of the user interface 120 of the system in FIGS. 1A and 1B. The user interface may include a home tab 121 (that is selected in FIG. 2) that provides a general overview of Cases, Opportunities, Appointments, Leads, Tasks, Calendar, Team Notices, and Pipeline for the particular user since each user interface is customized for each user based on the access levels and parameters associated with that particular user. The home tab may also include shortcuts to enter various different types of data, and a quick form for new contacts. The home tab also provides a quick overview of what customer tasks and activities that the user needs to focus on today. The portal module (selected using a "My portal" tab 122), contains a series of shortcuts which can link to any web site chosen by the user that may include e-mail, forums, or any other web-based application, allowing the system to become a single user interface for multiple applications. The calendar module may be selected by a calendar tab 124 and allows the user to view scheduled activities (by day, week, month or year), such as meetings, tasks, and calls. The system also allows the user to share his/her calendar with coworkers which is a powerful tool for coordinating the daily activities. The activities module is selected using an activities tab 126 and allows the user to create or update scheduled activities, or to search for existing activities. By managing Activities within the context of an Account, Contact, Lead, Opportunity, or Case, the system allows the user to manage the myriad of calls, meetings, notes, emails and tasks that the user needs to track in order to get the job done. The tasks are for tracking any action that needs to be managed to completion by a due date, the notes allow the user to capture note information as well as upload file attachments, the calls allow the user to track phone calls with leads and customers, meetings are like calls, but also allow the user to track the location of the meeting and emails allow the user to archive sent or received email messages and to send or receive email messages.

The contacts module is accessed by a contacts tab 128 and allows the user to view a paginated contact list, or search for a contact. The user can click on a specific contact to zoom in on the detailed contact record and, from a specific contact record, the user may link to the related account, or leads, opportunities, cases, or direct reports (related contacts). Within the system, contacts are the people with whom the organization does business. As with accounts, the system allows the user to track a variety of contact information such as title, email address, and other data. Contacts are usually linked to an Account, although this is not required. The accounts module may be accessed using an accounts tab 130 and the user may view a paginated account list, or search for an account. The user can click on a specific account to zoom in on the detailed account record and, from a specific account record, the user may link to related contacts, activities, leads, opportunities, cases, or member organizations. Accounts are the companies with which the organization does business and the system allows the user to track a variety of information about an account including website, main address, number of employees and other data. Business subsidiaries can be linked to parent businesses in order to show relationships between accounts.

The leads module may be accessed by a leads tab 132 that permits the user to view a paginated list of leads, or search for a specific lead. The user can click on an individual lead to zoom in on the lead information record and, from that detailed lead record, the user can link to all related activities, and see the activity history for the lead. Leads are the people or companies with whom the organization might do business in the future. Designed to track that first point of interaction with a potential customer, leads are usually the hand off between the marketing department and the sales department. Not to be confused with a contact or account, leads can often contain incomplete or inaccurate information whereas contacts and accounts stored in Sugar Enterprise are core to many business processes that require accurate data. Leads are typically fed into the Sugar Enterprise stem automatically from your website, trade show lists or other methods. However, the user can also directly enter leads into Sugar Enterprise manually.

The opportunities module is accessed by an opportunities tab 134 and permits the user to view a paginated list of opportunities, or search for a specific opportunity. The user can click on an individual opportunity to zoom in on the opportunity information record and, from that detailed opportunity record, the user can link to all related activities, see the activity history for the opportunity, and link to related leads and contacts. Opportunities track the process of selling a good or service to a potential customer. Once a selling process has commenced with a lead, a lead should be converted into a contact and possibly also an account for example among other items. Opportunities help the user manage the selling process by tracking attributes such as sales stages, probability of close, deal amount and other information. The quotes module may be accessed by a quotes tab 136 and permits the user to view a paginated list of customer quotes, or search for a specific quote. The user can click on an individual quote to zoom in on the detailed quote information. A quote is formed by referencing product and pricing from a catalog of products you may create. A presentation quality Portable Document Format (PDF) representation of the quote may be created to fax or email to a client. Quotes may be associated with, for example, Accounts, Contacts, or Opportunities among other modules in the system and the system is not limited to a quote being associated with any particular set of modules.

The products module may be accessed by a products tab 138 and permits the user to view a paginated list of products, or search for a specific product. The user can click on an individual product to zoom in on the detailed product information. A product is used when assembling a customer quote. The cases module may be accessed using a cases tab 140 and may permit the user to view a paginated list of cases, or search for a specific case. The user can click on an individual case to zoom in on the case information record and, from that detailed case record, the user can link to all related activities, see the activity history for the case, and link to related contacts. The cases are the handoff between the sales department and the customer support department and help customer support representatives manage support problems or inquiries to completion by tracking information for each case such as its status and priority, the user assigned, as well as a full trail of all related open and completed activities. A dashboard (such as that shown for example in FIG. 2B) module may be accessed using a dashboard tab 142 and permits the user to view a dashboard of the information in the CRM system.

The documents module may show the user a list of documents that the user can access, view and/or download. The user can also upload documents, assign publish and expiration dates, and specify which users can access them. The email module allows the user to write and send emails and to create Email Templates that can be used with email-based marketing campaigns. The user can also read, compose, save drafts, send and archive emails. The campaigns module helps the user implement and track marketing campaigns wherein the campaigns may be telemarketing, web banner, web tracker, mail or email based. For each Campaign, the user can create the Prospects list from the Contacts or Leads or outside file sources. The projects module helps the user manage tasks related to specific projects. Tasks can be assigned to different users and assigned estimated hours of effort and, as tasks are in progress and completed, users can update the information for each task. The RSS module permits the user to view the latest headlines provided by your favorite Really Simple Syndication (RSS) feeds. These feeds provide news or other web content that is distributed or syndicated by web sites which publish their content in this manner. The system has information on hundreds of RSS feeds available as supplied, and others may easily be added.

The forecasts module shows the user his/her committed forecast history and current opportunities. For managers, the user can view your team's rolled up forecasts. The reports module shows the user a list of saved custom reports not yet published, as well as a list of Published Reports. Saved reports may be viewed, deleted or published, and published reports may be viewed, deleted or un-published. Clicking on the name of a report zooms to the detailed definition of the report criteria (fields to be displayed, and filter settings) for that report, permitting the user to alter the criteria, and re-submit the report query. Finally, the dashboard module displays a graphical dashboard of the user's Opportunity Pipeline by Sales Stage, Opportunities by Lead Source by Outcome, Pipeline by Month by Outcome, and Opportunities by Lead Source. The system also supports users putting graphs from their reports directly on their dashboards.

Returning to FIG. 1A, the system also includes the database 110 that contains the data of the system and a security module 112 (row level security) that implements the security methods to control access to the data in the database 110 since the database is shared by all users of the system and the data must be segregated based on the users and their access level to different pieces of data. The system may also include a database abstraction layer 114 that is coupled between the database 110 and the SugarBean object 108 and acts as an interface between the database 110 and the SugarBean object 108. The SugarBean object 108 provides the base logic required for retrieving, making available and writing information to/from the database and each module creates subclasses of SugarBean (an example of which was described above) to provide module specific details, module specific data and module specific data views. During the process of retrieving data from the database, the SugarBean 108 makes calls that populate the row level security information into the SQL engine/database management system that retrieves the data.

Once the data is retrieved from the database by the SugarBean object 108, the module uses a template mechanism 118 and a theme 116 to produce the requested presentation (user interface) for the user. The template mechanism reformats the data from the database 110 into a particular form while the theme adjusts the user interface according to the user's preferences.

If, for instance, the user requests an HTML presentation of the detail view of the contact module for a specified contact, the system may perform that request as will now be described. The request of the user is directed to controller named index.php that handles most of the logic for the main application. The controller loads the current user information, verifies authentication and session information for the particular user session, loads the language for the user (based on the user preferences) and generates some of the user interface shell. The controller then calls the contact module and request the detail view for the specified contact. The contact module then retrieves the requested contact using the Sugarbean. The SugarBean verifies row level security for the requested contact at this point (with assistance from the security module 112. If the record is not retrieved successfully, then the process aborts and the user is not allowed to view the data for the record. If the retrieve process succeeds with the requested contact data, the Contact module uses the templating mechanism, such as for example XTemplate or Smarty, in the template mechanism 118 and the code for the current user's theme (retrieved by the theme module 116) is used to create the user interface for the presentation of the particular Contact data to the particular user. The resulting user interface then is sent back to the computing device with of client that requested it.

FIG. 1B illustrates more details of the customer relationship management system 100. Like elements shown in FIGS. 1A and 1B have like reference numerals. The system may interface with a typical browser application 103 (being executed by a computing device) that can access the system 100 over the web. For example, the examples of the user interface below are web-based views generated by the system and displayed on a browser application. The system may further comprise an application programming interface (APIs) portion 105, that may preferably use the well known simple object access protocol (SOAP), to interface with other existing system and applications. For example, the APIs may be used to interface to an email plug-in 109, such as an SugarCRM Plug-In for Microsoft Outlook®, that enhances the email program to allow it to interact with the system 100. As shown, the system 100, in one implementation, is implemented on a web server application 107 (that may be the well known Apache web server that includes IIS functionality) that generates dynamic web pages (using the known PHP language). The web server and the other elements of the system may be implemented as software running on one or more servers wherein the servers may use various different operating system as shown in FIG. 1B. The system 100 may also have an email module 111 capable of sending email via a local program (that may preferably be sendmail) or an email server leveraging the SMTP protocol.

A software application may include a hierarchical tagging system and method. In an exemplary embodiment, the hierarchical tagging system and method may be incorporated into the customer relationship management system shown in FIGS. 1A, 1B and 2 above and the hierarchical tagging system and method will be described with reference to the customer relationship management system although the hierarchical tagging system and method can be used with other systems and software applications.

In one embodiment in which the customer relationship management system shown in FIGS. 1A, 1B and 2 incorporates the hierarchical tagging system and method, the modules 106 of the system shown in FIG. 1 may include a hierarchical tagging module and the database 110 may include data associated with the hierarchical tagging system. In the customer relationship management system, the user interface of the customer relationship management system may include a knowledge base tab that permits the user to access the knowledge base which includes the hierarchical tagging system. The hierarchical tagging system and method permits zero, one, or more tags to be associated with each piece of content or articles so that a user of the application system may be able to modify/add tags to an article/piece of content, search based on tags, etc. . . . . Using the hierarchical tagging system, any number of tags may be created and linked to articles and each tag can either be flat (no sub-tags below or parent tags above for the particular tag) or hierarchical (wherein the tag has one or more parent tags and/or one or more child tags) and there is no inherent limit on the depth level of the tag hierarchy. For manageability reasons, an administrative limit may be imposed on the depth level of the tag hierarchy. The hierarchical tagging system may allow multiple tags with the same name at different locations in the tags tree and each instance has a different meaning (although the system does not permit two tags with the same name (label) to have the same parent tag).

In addition, the hierarchical tagging module may include a tag translation unit that internationalizes the displayed tags. In particular, when the application is internationalized for a particular foreign country, the tags are also translated into the language of the foreign country.

Figure 3:
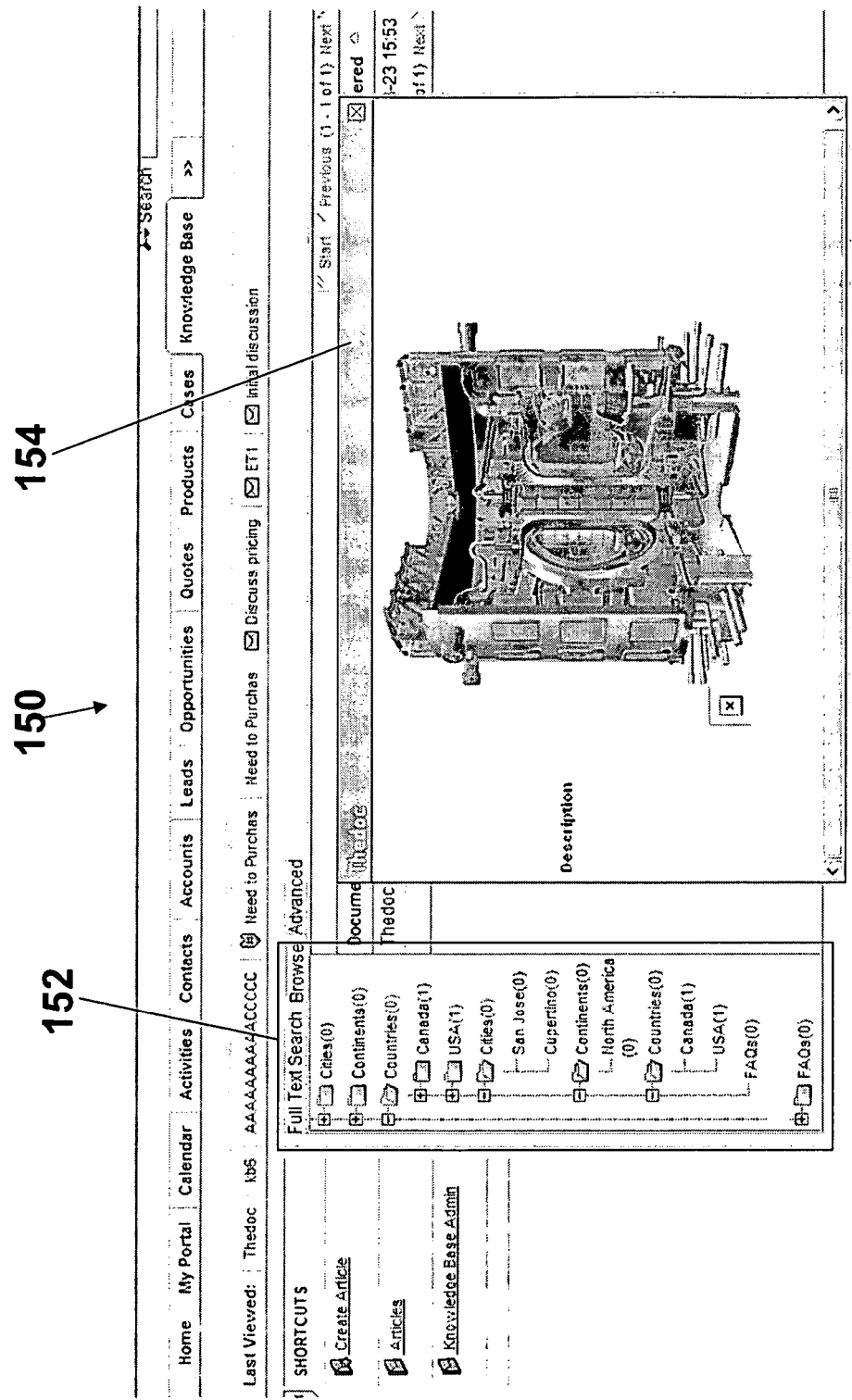
FIG. 3 illustrates an example of a user interface for browsing tags and articles with an article preview of a hierarchical tagging system.

FIG. 3 illustrates an example of a user interface 150 for browsing tags and articles with an article preview of a hierarchical tagging system. The user interface may include a hierarchical tag portion 152 that shows the tags and permits the user to select a particular tag. The user interface also may have an article list portion (underneath the preview popup) that lists all articles that have been associated with the currently selected tag. This article list may potentially include items associated with child tags of the current tag. The user interface also has an article preview portion 154 that permits the user to quickly view one of the articles in the list by hovering over it with the mouse. The article quick preview pop-up may also be triggered by clicking on an icon or a link on the article list As shown in FIG. 3, the hierarchical tagging system and method, for each tag, may track the number of articles associated with each tag (the number in parentheses in the hierarchical tag portion 152 in the exemplary embodiment). The user interface also permits the user to search for articles by tags and the user can use a partial name from a tag to find the associated articles. The hierarchical tagging system may also permit the user to provide partial tag hierarchies to locate tags and articles associated with them. As an example, to find a tag called "Software/Languages/PHP" it may be sufficient to search for "Languages/P". The search would turn up all tags that end in "Languages" and have a child tag that starts with "P".

The tree interface of the tags shown in the hierarchical tag portion 152 allows a user to move articles from one tag to another and can be used to associate multiple articles with a tag. The hierarchical tag portion 152 also may permit the user to delete tags that 1) may not have any articles and 2) may not have any sub-tags with articles.

Figure 4:
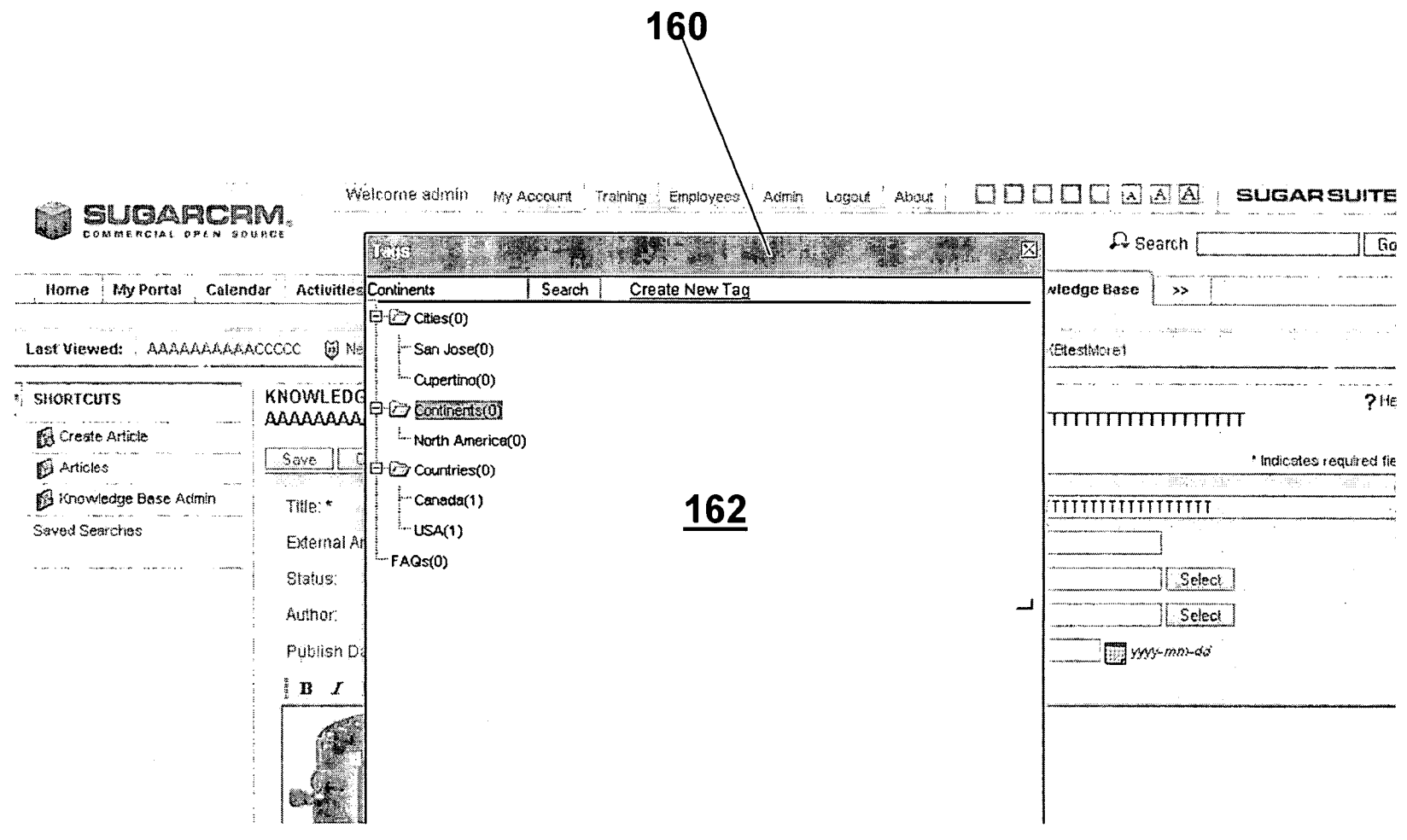
Figure 5:
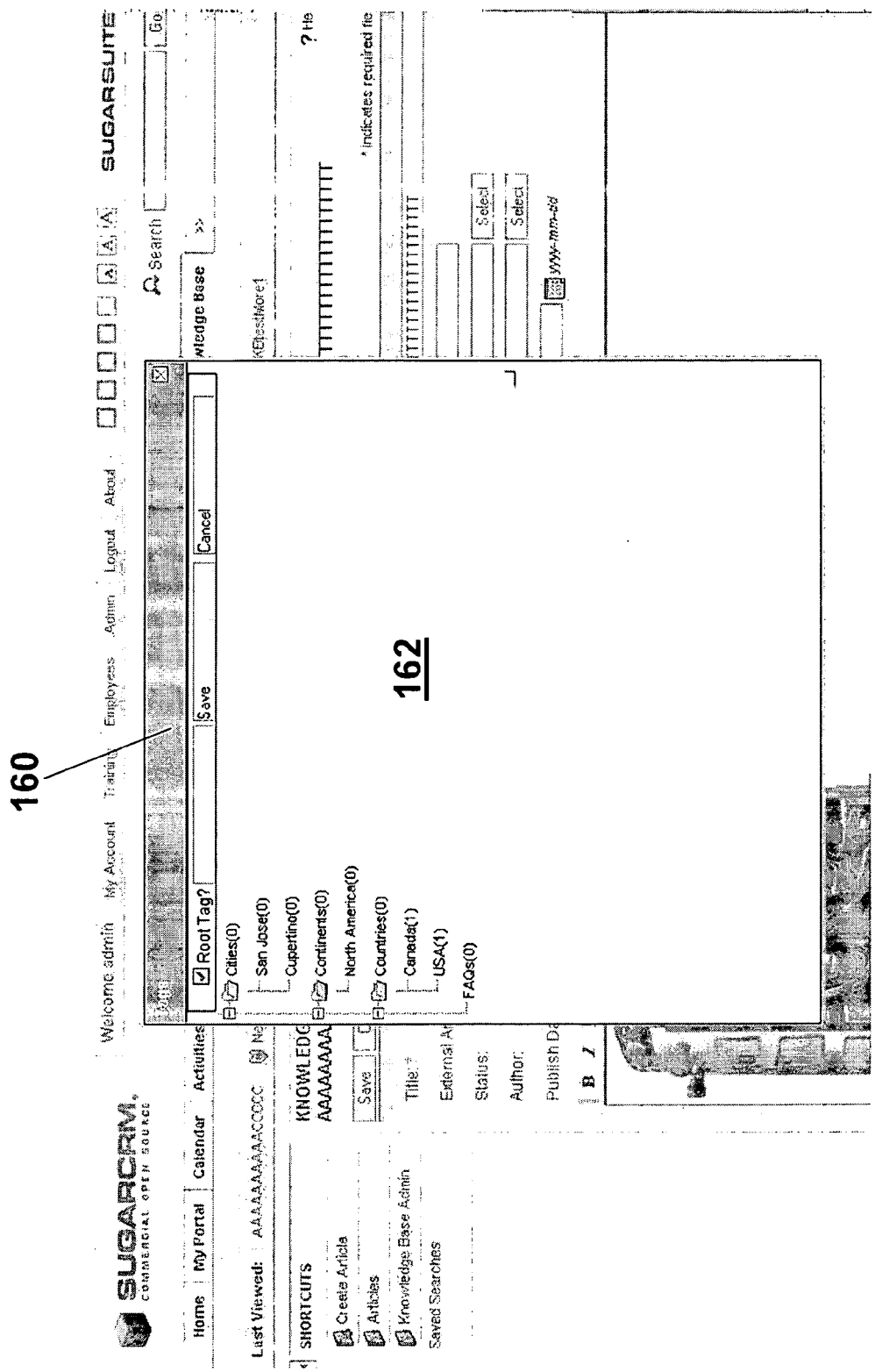
FIG. 5 illustrates an example of a user interface for adding a root tag of the hierarchical tagging system.
Figure 6:
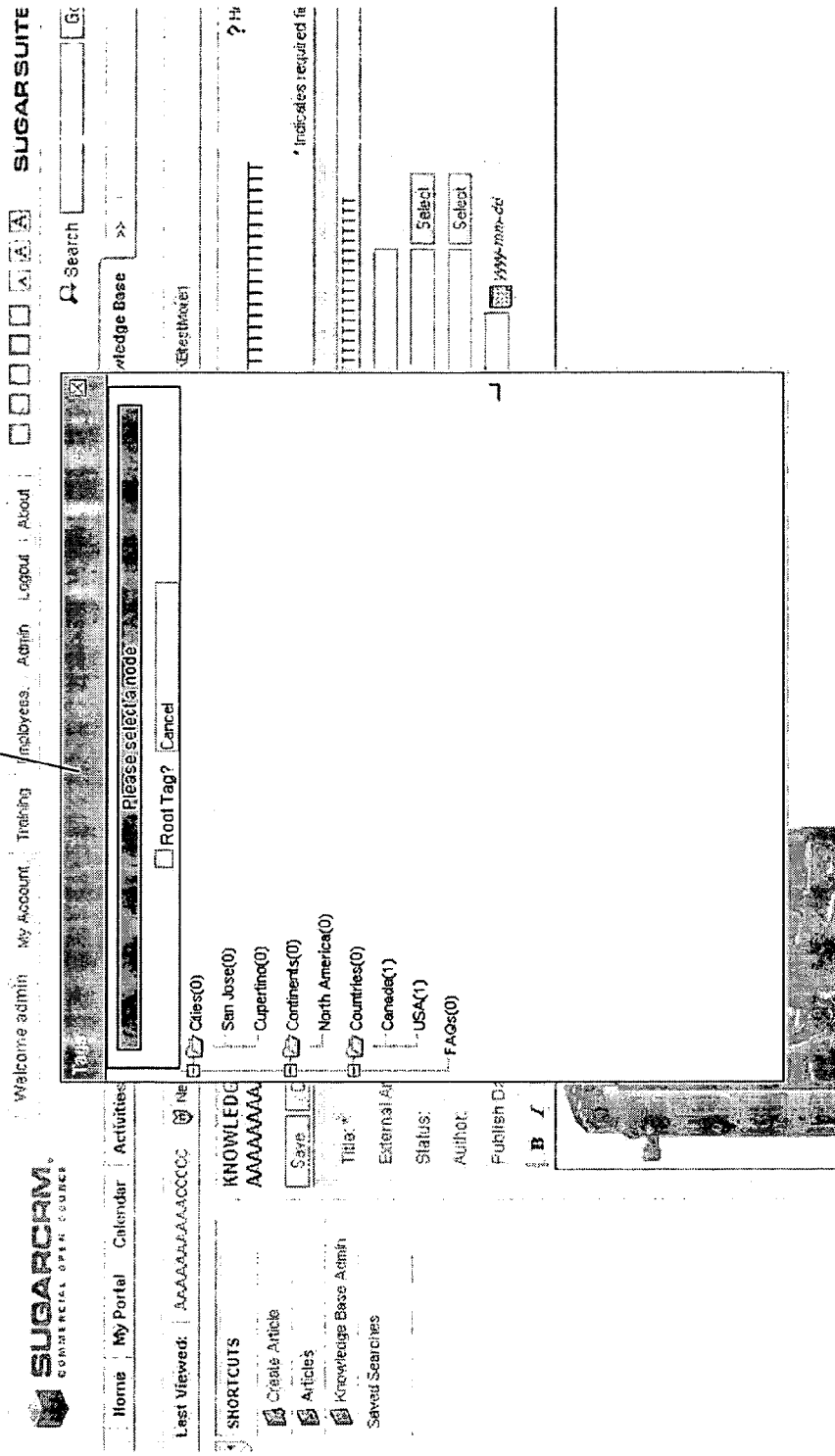
FIG. 6 illustrates a tag select and add user interface of the hierarchical tagging system.

The hierarchical tagging system provides a user interface 160 shown in FIGS. 4-6 in which the user can create tags and find tags for an article. FIGS. 4 and 5 illustrate an example of the user interface 160 wherein the user creates a new tag in a new tag screen 162. In FIG. 5, the user can add a new root tag into the tags of the system or may be administrator or role restricted. FIG. 6 illustrates a tag select and add 170 user interface of the hierarchical tagging system that is part of the same user interface shown in FIGS. 4-5. Using this screen, the user is able to search based on the existing tags in the system.

The hierarchical tagging system may also allow tags to be linked to other parent tags, such as "my favorite tags", which refers to a collection of other tags. This feature allows the monitoring of collections of tags of interest without needing to maintain duplicate lists. The hierarchical tagging system may also include a listing of new tags and/or tags with new articles associated therewith. The hierarchical tagging system may also support a deprecated flag for a tag and allow for a link to the new tag that should be used. This feature may be used when moving tag naming conventions. For example, "/PHP" may be deprecated with a link to "/Languages/PHP". A user interface for tagging items can allow a link directly to the new name.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A software application system, comprising:
a computing device with memory and a processing unit;
an application stored in the memory and having a plurality of lines of computer code wherein the plurality of lines of computer code are executed by the processing unit of the computing device to generate a user interface of the application;
a database coupled to the computing device and storing a multiplicity of articles associated with the application;
the application further comprising a hierarchical tagging component executing in the memory that stores in the database one or more tags arranged hierarchically in a tag hierarchy for an article amongst the articles wherein each article amongst the articles is tagged with a tag in the tag hierarchy and wherein the hierarchical tagging component performs a search for articles based on one or more selected tags in the tag hierarchy, the hierarchical tagging component further linking one of the tags of the tag hierarchy to a parent tag that refers to a collection of others of the tags of the tag hierarchy and monitoring a collection of the others of the tags without using a duplicate list of tags.

2. The system of claim 1, wherein the application is a customer relationship management (CRM) application.

3. The system of claim 1, wherein a particular tag amongst the tags in the tag hierarchy is labeled a favorite tag.

4. The system of claim 1, wherein a particular tag in the tag hierarchy further comprises a deprecated flag that provides a link to a new tag in the tag hierarchy.

5. The system of claim 1, wherein the articles are included as part of a knowledgebase of the CRM application.

6. The system of claim 5, further comprising an article list view of articles in the knowledgebase associated with a selected one of the tags in the tag hierarchy.

7. The system of claim 6, wherein the articles in the article list view are associated with a child tag of the selected one of the tags in the tag hierarchy.

8. The system of claim 1, further comprising a tag translation unit executing in the memory, the tag translation unit translating different ones of the tags in the tag hierarchy into a selected foreign language.

9. A hierarchical tagging method for a software application system operated on a computing device with a processing unit wherein the application has a plurality of lines of computer code, the method comprising:

generating a user interface of an application the application comprising a multiplicity of articles viewable through the user interface of the application;

storing, in the application, one or more tags arranged hierarchically in a tag hierarchy for an article amongst the articles wherein each article is tagged with a tag in the tag hierarchy;

linking one of the tags of the tag hierarchy to a parent tag that refers to a collection of others of the tags of the tag hierarchy and monitoring a collection of the others of the tags without using a duplicate list of tags; and performing, using the application, a search for an article amongst the articles based on one or more selected tags.

10. The method of claim 9, wherein the application is a customer relationship management (CRM) application.

11. The method of claim 9, wherein a particular tag amongst the tags in the tag hierarchy is labeled a favorite tag.

12. The method of claim 9 linking a new tag to a tag in the tag hierarchy with a deprecated flag.

13. The method of claim 9 further comprising searching for a tag at a specified level of the tag hierarchy.

14. The method of claim 9, wherein the articles are included as part of a knowledgebase of the CRM application.

15. The method of claim 14, further comprising displaying in an article list view articles in the knowledgebase associated with a selected one of the tags in the tag hierarchy.

16. The method of claim 15, wherein the articles in the article list view are associated with a child tag of the selected one of the tags in the tag hierarchy.

17. The method of claim 9, further comprising translating different ones of the tags in the tag hierarchy into a selected foreign language.

* * * * *